United States Patent [19]
Elahmadi et al.

[11] Patent Number: 6,154,296
[45] Date of Patent: Nov. 28, 2000

[54] TELECOMMUNICATIONS NETWORK HAVING SHARED PROTECT CAPACITY ARCHITECTURE

[75] Inventors: Siraj Nour Elahmadi, Dallas; Paul A. Bullock, Plano; Kesavamurthy Nagaraj, Plano; Thomas Flanagan, Plano, all of Tex.

[73] Assignee: Northern Telecom Limited, Montreal, Canada

[21] Appl. No.: 08/964,823

[22] Filed: Nov. 5, 1997

[51] Int. Cl.⁷ .................................................. H04B 10/08
[52] U.S. Cl. .......................... 359/119; 359/110; 370/16.1
[58] Field of Search .................... 359/110, 119, 359/134, 174; 370/227, 228

[56] References Cited

U.S. PATENT DOCUMENTS

| | | | |
|---|---|---|---|
| 4,646,286 | 2/1987 | Reid et al. | 370/16 |
| 4,837,760 | 6/1989 | Reid et al. | 370/16 |
| 5,179,548 | 1/1993 | Sandesara | 370/16.1 |
| 5,406,549 | 4/1995 | Kremer | 370/16.1 |
| 5,442,623 | 8/1995 | Wu | 370/16.1 |
| 5,760,934 | 6/1998 | Sutter et al. | 359/119 |
| 5,777,761 | 7/1998 | Fee | 359/110 |
| 5,978,354 | 11/1999 | Taketomi et al. | 370/226 |

OTHER PUBLICATIONS

Sosnosky, J. et al., "Sonet Ring Applications for Survivable Fiber Loop Networks," IEEE Communications Magazine, vol. 29, No. 6, Jun. 1, 1995, pp. 51–58.

Imanaka et al, "A Reconfiguration Method for Fiber Optic Subscriber Loops," Electronics & Communications in Japan Part I—Communications, vol. 78, No. 6, Jun. 1, 1995, pp. 54–66.

Hamazumi, Y. et al., "Number of Wavelengths Required for Constructing Optical Path Network Considering Restoration," Electronics & Communication in Japan Part I—Communications, vol. 78, No. 7, Jul. 1, 1995, pp. 30–41.

*Primary Examiner*—Leslie Pascal
*Assistant Examiner*—Dalzid Singh
*Attorney, Agent, or Firm*—Haynes and Boone, LLP

[57] ABSTRACT

An optical communications network configured in a shared protect capacity architecture. The network includes a plurality of shared and unshared nodes; a plurality of working lines connecting the plurality of nodes to form a ring that shares two or more nodes with another ring; a shared protect fiber optic line connecting the two shared nodes; and a plurality of protect lines connecting the plurality of unshared nodes which are connected by the plurality of working lines. By optically coupling a first Add-Drop Multiplexer of a first shared node to a first port of an optical cross connect using a first connecting path; optically coupling a second Add-Drop Multiplexer of the first shared node to a second port of the optical cross connect using a second connecting path; and optically coupling a third port of the Optical Cross Connect to a second shared node through a shared protect path, both rings may use the shared protect path to re-route traffic therethrough in the event that one of the rings has a break which severs the working and protect lines which couple two of the nodes thereof. The reduction in the quantity of protect lines, hence the fiber, and the equipment resulting in the associated cost savings are transparent to bit or baud rate, type of optical fiber, and signal format.

21 Claims, 3 Drawing Sheets

LRE = LINE REGENERATING EQUIPMENT

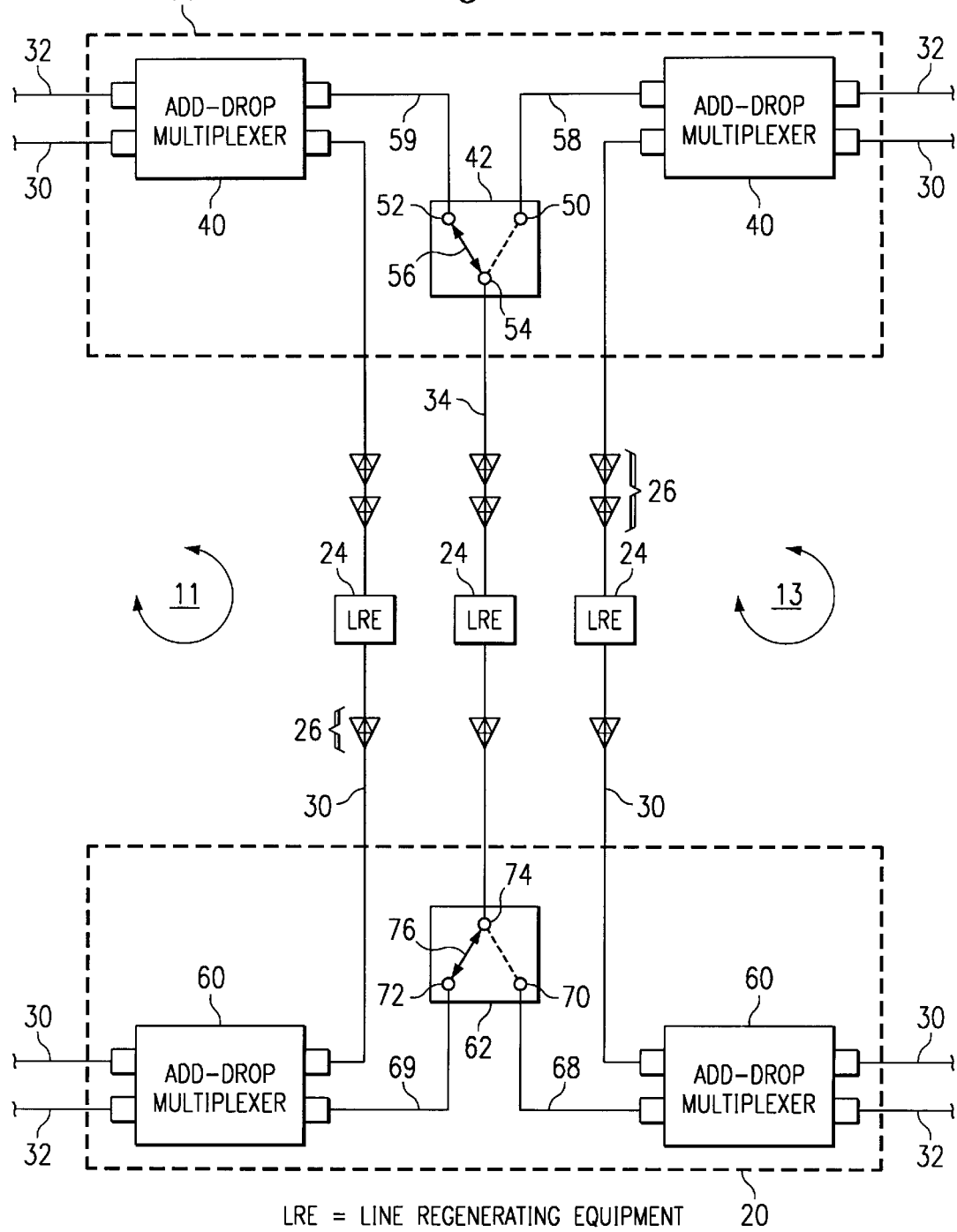

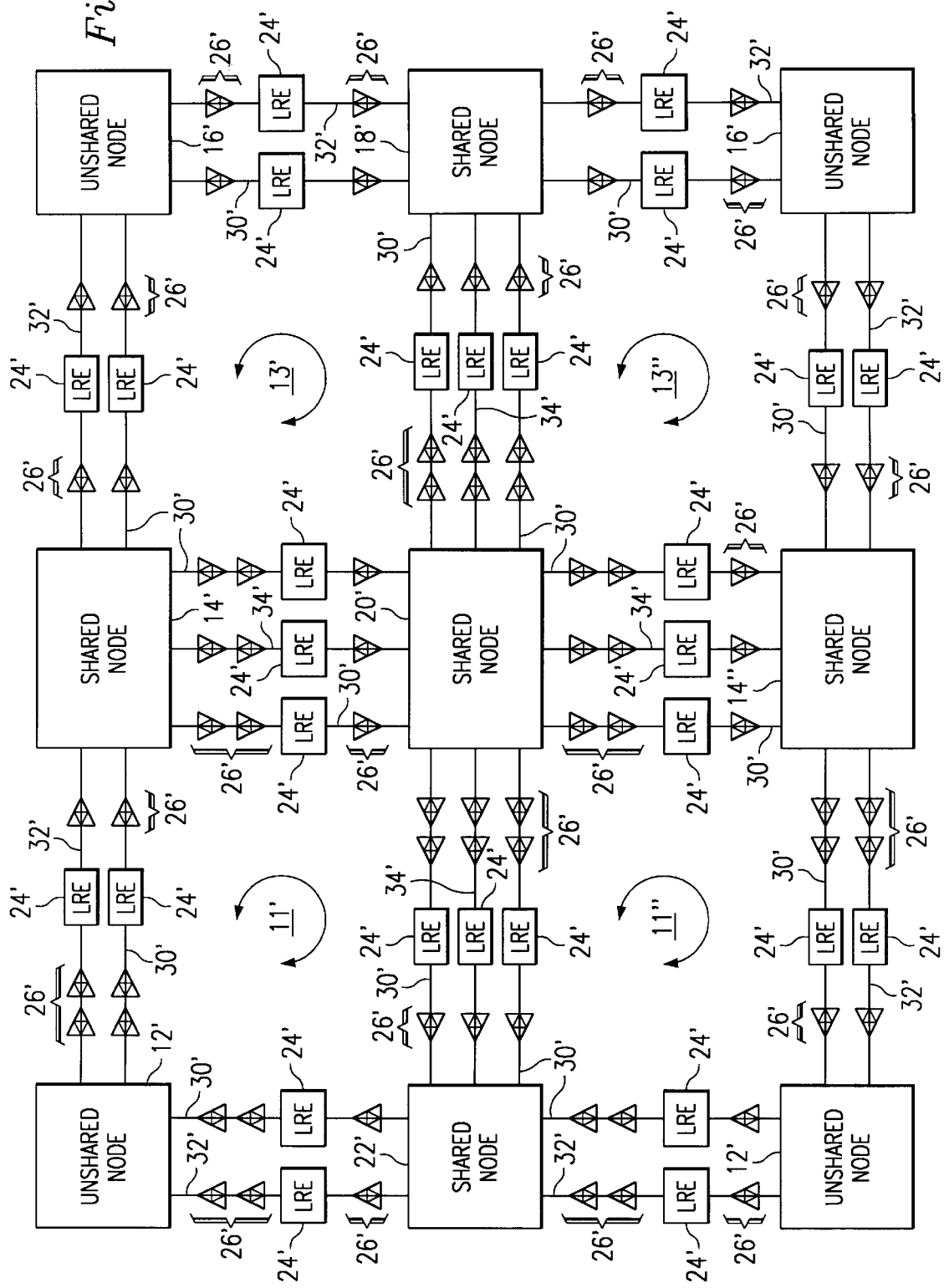

TELECOMMUNICATIONS NETWORK HAVING SHARED PROTECT CAPACITY ARCHITECTURE

TECHNICAL FIELD

The invention relates generally to telecommunication networks and, more particularly, to a telecommunications network having a shared protect capacity architecture in which overlapping rings share protect lines.

BACKGROUND OF THE INVENTION

A telecommunications network, for example, the public switched telephone exchange (PSTN), enables the transfer of voice and data between terminals at geographically separated locations. One such network can be comprised of a series of nodes, each typically located in a city or other high traffic location, coupled together in a closed loop or ring architecture by fiber optic cables. The information travels along the fiber optic cables according to an optical transmission standard commonly known as either synchronous digital hierarchy (SDH) or synchronous optical networks (SONET). Ring architectures have long been preferred for such networks since they provide two separate paths for the flow of information between any two nodes of the ring.

In a fiber optic network which utilizes a four fiber ring architecture, traffic between adjacent nodes is normally carried on a first optical fiber commonly referred to as a working line. The nodes are also coupled together by a second optical fiber commonly known as a protect line. The diverse protect lines are use to restore the flow of information through the network during a failure or break in the lines which couple adjacent nodes of the network. Specifically, when the lines which couple adjacent nodes break, switching technology within the network nodes will re-route traffic between the nodes along an alternate path using the protect lines to circumvent the cable failure, thereby avoiding network outage.

Most networks are configured in a multi-ring architecture. In such networks, more than one ring will share a common node. Other multi-ring networks include overlapping ring sections, which result when a pair of rings share two or more adjacent nodes. If information transfers between the rings are possible, for example, at either of the common nodes, the overlapping ring section is said to be interconnected. A conventionally configured overlapping ring section with two rings, which is interconnected at both of the shared nodes, uses two bidirectional working lines and two bidirectional protect lines to couple the nodes. Of these lines, however, one working and one protect are dedicated to each one of the pair of rings. Accordingly, if a break occurs in one of the rings and the network re-routes traffic through the overlapping section thereof, the re-routed traffic will use the protect line dedicated to that ring. Consequently, one protect line in the overlapping ring section is redundant and not used.

Therefore what is needed is a method and an apparatus to eliminate redundant protect lines in an overlapping or on an inter-connecting route amount rings, thereby achieving tremendous savings in equipment and fiber costs, which does not sacrifice the quality of service or network capacity and survivability.

SUMMARY OF THE INVENTION

The present invention, accordingly, reduces the cost of constructing a multi-ring optical network having interconnected overlapping ring sections by providing an optically switched path in which the overlapping ring sections share a common protect line. In this manner, costs associated with the construction and maintenance of a second protect line for each overlapping ring section is eliminated. Further, since simultaneous breaks in each of the two rings which share the overlapping ring section is highly unlikely, the cost savings are achieved without a corresponding reduction in the survivability of the network to handle outages. To this end, the optical network is comprised of a plurality of nodes. Working lines connect the nodes to form a pair of rings in which two of the nodes are shared while the remainder are unshared. A shared protect line connects the two shared nodes. Those unshared nodes coupled together by a working line are further coupled by a corresponding protect line. In one aspect thereof, the shared node includes first and second Add-Drop Multiplexers, each of which connect the shared node to the working and protect lines which couple the shared node to an unshared node of a respective one of the pair of rings, and an optical cross connect which couples each of the first and second Add-Drop Multiplexers to the shared protect line.

An advantage of the present invention is that the quantity of equipment and fiber used in the network are reduced, thereby resulting in tremendous cost savings. Furthermore, the network's costs are significantly reduced while the improvements achieved by the present invention work on any network type because the present invention is transparent to the bit or baud rate. Additionally, the present invention works with any type of optical fiber and/or cable and signal formatting.

BRIEF DESCRIPTION OF THE DRAWINGS

FIG. 2 is an enlarged block diagram of a portion of the optical network of FIG. 1 showing the interconnection between a pair of shared nodes thereof.

FIG. 3 is a block diagram of a multi-ring optical network having multiple interconnected overlapping ring sections.

DESCRIPTION OF A PREFERRED EMBODIMENT

Figure 1:
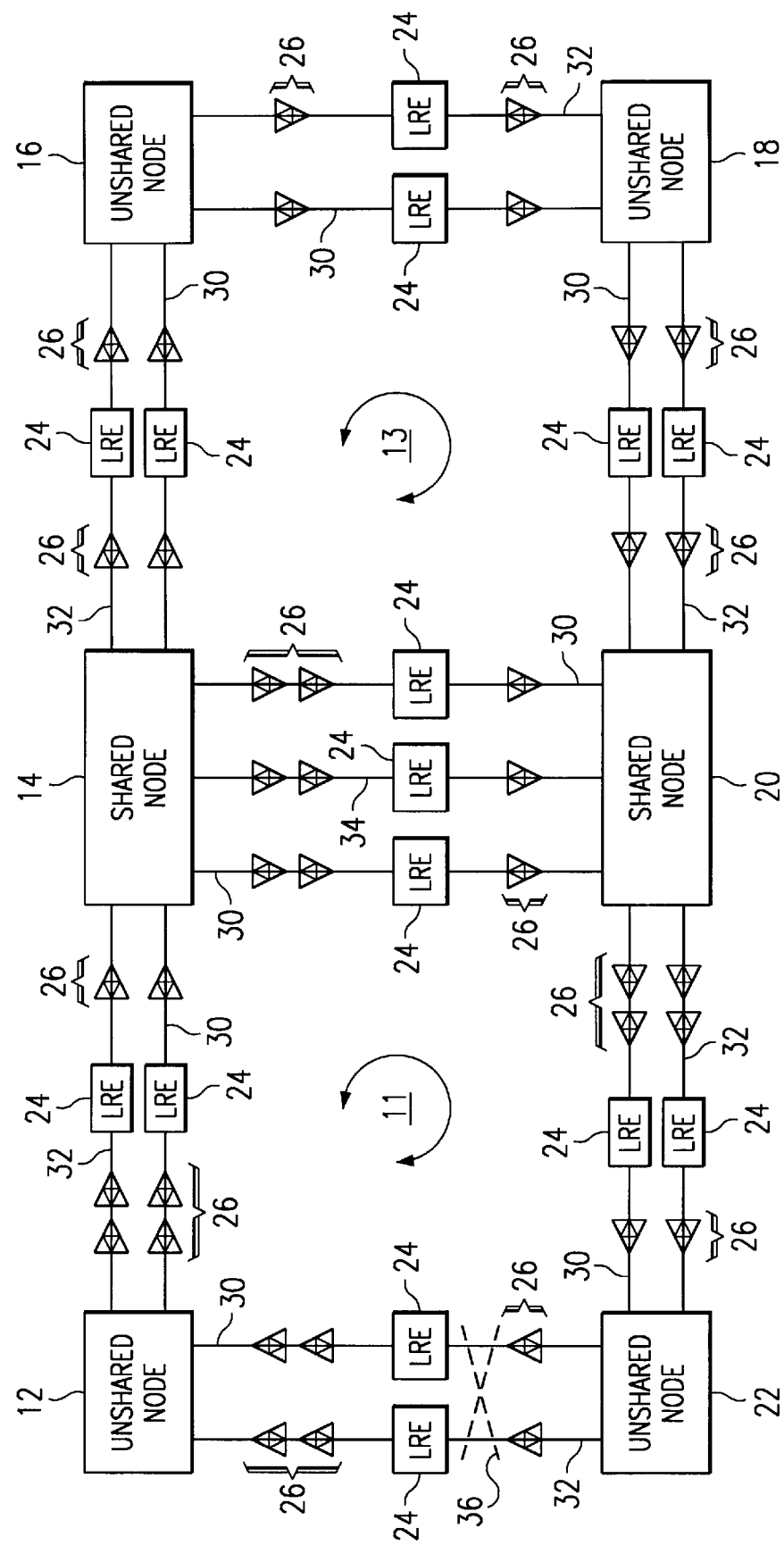
FIG. 1 is a block diagram of a multi-ring optical network having an interconnected overlapping ring section embodying features of the present invention.

FIG. 1 illustrates a multi-ring optical communication network, generally designated 10, having two shared nodes 14 and 20, four unshared nodes designated 12, 16, 18, and 22, working lines 30, protect lines 32, a shared protect line 34, Line Regenerating Equipment (LREs) 24, and optical amplifiers 26, such as Multi-wavelength Optical Repeaters (MORs). While, in the disclosed embodiment of the invention, the multi-ring optical communication network 10 is established in accordance with the SONET protocol, it should be clearly understood that the invention is equally suitable for use with other types of optical communication networks. It should be further understood that the disclosure of the multi-ring optical communication network 10 as having two rings which share a single overlapping ring section interconnected at opposite ends thereof by respective ones of two shared nodes and having an equal number of unshared nodes is purely exemplary and that a multi-ring optical communication network 10 constructed in accordance with the teachings of the present invention may be variously configured as to the number of rings, overlapping sections, shared nodes and unshared nodes.

As an optical signal travels through the multi-ring optical communication network 10, for example, along path 11, losses resulting in reduced signal strength occur. In order to overcome the losses in signal strength, LREs 24 and optical amplifiers 26 are used to regenerate the signal strength as it travels between coupled pairs of the nodes 12, 14, 16, 18, 20 and 22. The distance separating the LREs 24 and the optical amplifiers 26 depends on a number of factors such as the bit rate, fiber type, and the technology used by an owner of the network.

As previously stated, the multi-ring optical communication network 10 is comprised of a combination of unshared nodes 12, 16, 18 and 22 and shared nodes 14 and 20. The working lines 30 are configured for bi-directional exchanges of optical data between adjacent nodes coupled to opposite ends thereof. Accordingly, the working lines 30 carry all traffic between the nodes coupled thereby. While a single working line 30 typically couples each pair of adjacent nodes, for overlapping ring sections, two working lines 30 couple the adjacent nodes. For example, in the multi-ring optical communication network 10, the shared node 14 is coupled to the shared node 20 by two working lines 30 while the remaining nodes are coupled to the adjacent nodes by a single working line 30. Thus, the unshared node 12 is coupled to the shared node 14 via a single working line 30. In a similar manner, the shared node 14 is coupled to the unshared node 16, the unshared node 16 is coupled to the unshared node 18, the unshared node 18 is coupled to the shared node 20, the shared node 20 is coupled to the unshared node 22, and the unshared node 22 is coupled to the unshared node 12 by a single working line 30. For the overlapping ring section which extends between the shared node 14 and the shared node 20, a first one of the two working lines 30 is part of a ring 11 which couples the nodes 12, 14, 20 and 22 while a second one of the two working lines 30 is part of a ring 13 which couples the nodes 14, 16, 18 and 20.

In use, the working lines 30 in the multi-ring optical communication network 10 will sometimes fail, for example, when a physical break occurs in the working line 30. In order to prevent disruptions in the flow of traffic, protect lines 32 are used, in conjunction with a shared protect line 34, as a back-up to the working lines 30. Protect lines 32 connect unshared nodes that form the non-overlapping sides of the rings 11 and 13 to the shared nodes 14 and 20. For example, the protect line 32 connects the node 12 to the shared node 14 of the ring 11. In a similar manner, protect lines 32 connect the shared node 14 to the unshared node 16, the unshared node 16 to the unshared node 18, the unshared node 18 to the shared node 20, the shared node 20 to the unshared node 22, and the unshared node 22 to the unshared node 12. Where the ring 11 and the ring 13 overlap, the shared protect line 34 connects the shared node 14 to the shared node 20.

If a break occurs along a section of the ring, for example, if a break 36 (shown in phantom in FIG. 1) occurs between the unshared node 12 and the unshared node 22 of the ring 11, information can no longer be transferred between the unshared node 12 and the unshared node 22 using the working line 30 for the ring section where the break 36 has occurred. As breaks, such as the break 36, typically sever both the working line 30 and the protect line 32, the protect line 32 connecting the unshared nodes 12 and 22 is similarly unavailable for use. The break 36 is detected by switching circuitry residing within the nodes 12 and 22 located on either side of the break 36 in the ring 11. Upon detection thereof, a break signal (not shown) is sent to all other nodes that are part of the ring 11. The nodes 12, 14, 20 and 22 will act to re-route all traffic between the unshared nodes 12 and 22 along the protect line 32 coupling the unshared node 12 and the shared node 14, the shared protect line 34 coupling the shared nodes 14 and 20 and the protect line 32 coupling the shared node 20 and the unshared node 22, thereby allowing traffic between unshared nodes 12 and 22 to continue despite the break 36 in the ring section coupling the unshared nodes 12 and 22.

The aforementioned re-routing is achieved by the components of the switching circuitry which reside at each node 12, 14, 20 and 22. These components switch and restore traffic throughout the ring 11 using the protect lines 32 and the shared protect line 34. Consequently, traffic that would have traveled along the working line 30, between the unshared nodes 12 and 22, travels along the protect lines 32 and the shared protect line 34 of ring 11. FIG. 2 shows, in detail, the switching components which reside at the shared node 14 and the shared node 20. The shared node 14 contains a pair of 4 Fiber Add-Drop Multiplexers (ADMs) 40 and an optical cross connect (OXC) 42. The ADM 40 has four bidirectional ports. In an alternative embodiment the ADM 40 could be configured with eight unidirectional ports. Two opposite ports of the ADM 40 are connected to working lines 30; a third port is connected to the protect line 32 and a fourth port is connected to the OXC 42, as discussed below. The OXC 42 has three ports 50, 52, and 54. Port 54 of the OXC 42 is connected to the shared protect line 34. An internal switch 56 optically connects the port 54 to either the port 50 or the port 52 depending on the location of the break 36 in FIG. 1. The port 50 is connected to one port of the ADM 40 using a connecting path 58, to handle traffic for the ring 13 should a line break occur in the ring 13. Likewise, the port 52 of the OXC 42 is connected to one port of the other ADM 40, located at shared node 14, using a connecting line 59 to handle traffic for the ring 11 should the line break occur in the ring 11. Similarly, the shared node 20 contains a pair of ADMs 60 and a OXC 62. The pair of ADMs 60 each have four bidirectional ports. Two opposite ports are connected to working lines 30; a third port is connected to the protect line 32 and a fourth port to the OXC 62. The OXC 62 has three ports 70, 72, and 74. The port 74 is connected to the shared protect line 34. An internal switch 76 optically connects the port 74 to either the port 70 or the port 72 depending on the location of the break 36 in FIG. 1. The port 70 is connected to one port of the ADM 60 using a connecting path 68, to handle traffic for the ring 13 should a line break occur in the ring 13. Likewise, the port 72 is connected to one port of the other ADM 60 using a connecting path 69, to handle traffic for the ring 11 should a line break occur in the ring 11.

When the break 36 occurs, the break signal is sent to the ADMs 40 residing on the ring 11, to the OXC 42 and to the OXC 62. The break signal causes the internal switch 56 of the OXC 42 to optically connect the port 52 to the port 54. Similarly, the break signal causes the internal switch 76 of the OXC 46 to optically connect the port 72 to the port 74. Thus, the ADM 40 for the ring 11 located at the shared node 14 is optically connected to the ADM 60 for the ring 11 located at the shared node 20. Hence, an optical path is created between the shared node 14 and the shared node 20 through the shared protect line 34.

The unshared nodes 12, 16, 18, and 22 operate in the same way as the shared nodes 14 and 20, but without the OXC 42 and 62 because there are no shared protect lines connected to the unshared nodes 12, 16, 18, and 22. Accordingly, the third and the fourth ports of the ADM 40 located at each node are optically coupled to the protect lines 32. For example, node 12 has only one ADM (not shown) connected to a pair of working lines 30 and a pair of protect lines 32 to route traffic along the protect line 32 to the shared node 14. Accordingly, when the break 36 occurs in the ring 11, traffic at the unshared node 12 is re-routed through the protect line 32 that couples the unshared node 12 and the shared node 14, the ADM 40 at the shared node 14, the connecting line 59, the OXC 42, the shared protect line 34, the OXC 62, the connecting line 69, the ADM 40 at the shared node 20 and the protect line 32 that connects the shared node 20 to the unshared node 22. Consequently, a complete path is created using only a single protect line, the shared protect line 34, between the overlapping portion of two different rings.

FIG. 3 shows another multi-ring optical communication network, generally designated 10', having five shared nodes designated 14', 18', 20', 22', and 14", and four unshared nodes 12', 16', 12" and 16", working lines 30', protect lines 32', shared protect lines 34', ADMs (not shown), OXCs (not shown), LRE 24', and Optical amplifier 26'. The multi-ring optical communication multi-ring optical communication network 10' has four rings designated 11', 13', 11", and 13". Thus, the multi-ring optical communication network 10' is similar to the multi-ring optical communication network 10, of FIG. 1, except there are three more nodes and two more rings in the network 10'. Accordingly, the multi-ring optical communication network 10' handles a break in the working line 30' similar to the multi-ring optical communication network 10, in FIG. 2. The shared node 14' and the shared node 14" function similar to the shared node 14 of the network 10, in FIG. 1. The shared node 20' differs from the shared node 20, in FIG. 2; the shared node 20' has two more ADMs and three more OXCs because the shared node 20' handles the traffic for the rings 11', 13', 11", and 13". Thus, if a break (not shown) occurs between the unshared nodes 12' and 22' of the ring 11', the traffic is re-routed through the protect line 32', located between the unshared node 12' and the shared node 14', and the shared protect paths 34' located between the shared nodes 14', 20' and 22' using the ADMs and OXCs at the shared nodes 14', 20' and 22'.

By configuring overlapping sections of a multi-ring optical network in this manner, unnecessarily redundant equipment purchases caused by providing a pair of protect lines between each pair of share nodes has been eliminated. Specifically, each protect line connecting the shared nodes includes a number of LREs, Optical amplifiers or other types of optical fiber amplifiers and Wave Division Multiplexers (WDMs). Elimination of one of the two protect lines in the overlapping network ring section would result in tremendous cost savings since about 40% of the cost associated with setting up an optical network is consumed by the LREs. Accordingly, reducing the number of lines between two nodes reduces the number of LREs and optical amplifiers, thereby resulting in dramatic cost savings.

In another embodiment additional multi-ring optical networks can be established, such as stacked rings. The additional multi-ring optical networks geographically incorporate the same cities or nodes as an existing multi-ring optical network ring, but operate independent of each other. These additional multi-ring optical networks operate in the same manner as the multi-ring optical network 10 of FIG. 1. Thus, utilizing shared protect lines in the additional multi-ring optical networks results in further cost savings.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. An optical network with a reduced number of protect fibers and associated equipment, the network comprising:
    a plurality of nodes, comprising:
        at least two shared nodes; and
        a plurality of unshared nodes;
    a plurality of working lines, each one of the plurality of working lines connecting a pair of the plurality of nodes to form at least two rings, wherein first and second ones of the at least two rings each include a respective working line connecting first and second ones of the at least two shared nodes; and
    a plurality of back-up lines comprising:
        at least one shared protect line connecting the at least two shared nodes: and
        a plurality of protect lines, each one of the plurality of protect lines connecting one of the plurality of unshared nodes to one other of the plurality of nodes connected by one of the plurality of working lines;
        wherein said first and second ones of said at least two shared nodes are connected by a first one of said at least one shared protect lines, said first one of said at least one shared protect lines acting as a back-up line for both said first one of said at least two rings and said second one of said at least two rings.

2. The network of claim 1 wherein each unshared node of the plurality of unshared nodes comprises at least one Add-Drop Multiplexer, the Add-Drop Multiplexer having a first pair of opposite ports optically coupled to each of the working lines connecting the unshared node to other nodes of the plurality of nodes and a second pair of ports optically coupled to each of the protect lines connecting the unshared node to other nodes of the plurality of nodes.

3. An optical network with a reduced number of protect fibers and associated equipment, the network of claim 1 comprising:
    a plurality of nodes, comprising:
        at least two shared nodes; and
        a plurality of unshared nodes;
    a plurality of working lines, each one of the plurality of working lines connecting a fail of the plurality of nodes to form at least two rings, wherein first and second ones of the at least two rings each include a respective working line connecting the at least two shared nodes; and
    a plurality of back-up lines comprising:
        at least one shared protect line connecting the at least two shared nodes; and
        a plurality of protect lines, each one of the plurality of protect lines connecting one of the plurality of unshared nodes to one other of the plurality of nodes connected by one of the plurality of working lines:
            wherein a first shared node of the at least two shared nodes comprises:
                a first Add-Drop Multiplexer having a first pair of opposite ports optically coupled to working lines of a first working ring passing through the first shared node and one port of a second pail of opposite ports optically coupled to a protect line of a first protect ring passing through the first shared node;
            a second Add-Drop Multiplexer having a first pair of opposite ports optically coupled to working lines of a second working ring passing through the first shared node and one port of a second pair of opposite ports optically coupled to a protect line of a second protect ring passing through the first shared node; and an optical cross connect comprising:
  a first port optically coupled to a second port of the second pair of opposite ports of the first Add-Drop Multiplexer through a first connecting line;
  a second port optically coupled to a second port of the second pair of opposite ports of the second Add-Drop Multiplexer through a second connecting line;
  a third port optically coupled to a second shared node of the at least two shared nodes through the shared protect line; and
  an internal switch for selectively coupling one of the first and second ports of the optical cross connect to the third port of the optical cross connect.

4. The network of claim 1 wherein a first shared node of the at least two shared nodes comprises:
  a plurality of Add-Drop Multiplexer, wherein each one of the plurality of Add-Drop Multiplexers has a first pair of opposite ports to optically couple two of the plurality of working lines that form a portion of each one of the at least two rings passing through the first shared node; and
  a plurality of optical cross connects, wherein each one of the plurality of optical cross connects comprises:
    a pair of adjacent connecting ports, wherein each one of the pair of adjacent connecting ports is optically coupled to one Add-Drop Multiplexer of the plurality of Add-Drop Multiplexers;
    a third connecting port optically coupled to one of the at least one shared protect line; and
    an internal switch for optically coupling one of the pair of adjacent connecting ports to the third connecting port, thereby optically coupling the first shared node of the at least two shared nodes to a second shared node of the at least two shared nodes.

5. The network of claim 4 wherein each one of the plurality of Add-Drop Multiplexers is a 4-Fiber Add-Drop Multiplexer.

6. The network of claim 1 further comprising:
  a plurality of Line Regenerating Equipment located at predetermined intervals along each one of the plurality of working lines and each one of the plurality of back-up lines; and
  a plurality of optical amplifiers located at predetermined intervals along each one of the plurality of working lines and each one of the plurality of back-up lines.

7. An optical network with a reduced number of protect paths, the network comprising:
  a plurality of working rings having a plurality of nodes wherein at least two nodes of the plurality of nodes are shared by at least two working rings of the plurality of working rings;
  at least one shared protect line optically coupling the at least two shared nodes; and
  a plurality of protect lines optically coupling each unshared node to another node of the plurality of nodes connected by one working line of the plurality of working lines thereby forming a plurality of protect rings to act as a back-up for the plurality of working rings.

8. The network of claim 7 wherein each shared node of the at least two shared nodes comprises:
  at least two Add-Drop Multiplexers, each of the at least two Add-Drop Multiplexers optically coupled to one working ring of the plurality of working rings passing through the shared node; and
  at least one optical cross connect optically coupled to a pair of the at least two Add-Drop Multiplexer and the shared protect line thereby completing at least two paths for at least two protect rings of the plurality of protect rings.

9. The network of claim 7 further comprising:
  a plurality of Line Regenerating Equipment located at predetermined intervals along the plurality of working, protect, and shared protect lines; and
  a plurality of optical amplifiers located at predetermined intervals along the plurality of working, protect, and shared protect lines.

10. A method of reducing protect lines between two shared nodes of two protect rings in an optical network, the method comprising the steps of:
  optically coupling a first side of a first Add-Drop Multiplexer of a first shared node to a first port of an optical cross connect using a first connecting line;
  optically coupling a second side of said first Add-Drop Multiplexer of said first shared node to a first one of said two protect rings;
  optically coupling a first side of a second Add-Drop Multiplexer of the first shared node to a second port of the optical cross connect using a second connecting line; and
  optically coupling a second side of said second Add-Drop Multiplexer of said first shared node to a second one of said two protect rings; and
  optically coupling a third port of the optical cross connect to a second shared node through a shared protect line;
  said first Add-Drop Multiplexer, said second Add-Drop Multiplexer and said optical cross connect being operative to selectively couple said first protect ring or said second protect ring to said shared protect line.

11. The method of claim 10 further comprising the steps of:
  optically coupling a first Add-Drop Multiplexer of the second shared node to a first port of a second optical cross connect using a third connecting line;
  optically coupling a second Add-Drop Multiplexer of the second shared node to a second port of the second optical cross connect using a fourth connecting line; and
  optically coupling a third port of the second optical cross connect to the shared protect line.

12. The method of claim 11 further comprising the steps of:
  optically coupling the first Add-Drop Multiplexer of the first shared node to the first Add-Drop Multiplexer of the second shared node through a plurality of nodes using a plurality of working lines to form a first working ring; and
  optically coupling the first Add-Drop Multiplexer of the first shared node to the first Add-Drop Multiplexer of the second shared node through the plurality of nodes using a plurality of protect lines to form a first protect ring.

13. The method of claim 12 further comprising the steps of:
  optically coupling the second Add-Drop Multiplexer of the first shared node to the first Add-Drop Multiplexer of the second shared node through a second plurality of nodes using a second plurality of working lines to form a second working ring; and optically coupling the second Add-Drop Multiplexer of the first shared node to the first Add-Drop Multiplexer of the second shared node through the second plurality of nodes using a second plurality of protect lines to form a second protect ring.

14. A method of reducing protect lines between two shared nodes of two protect rings in an optical network, the method comprising the steps of:

optically coupling a first Add-Drop Multiplexer of a first shared node to a first port of an optical cross connect using a first connecting line;

optically coupling a second Add-Drop Multiplexer of the first shared node to a second port of the optical cross connect using a second connecting line;

optically coupling a third port of the optical cross connect to a second shared node through a shared protect line;

optically coupling a first Add-Drop Multiplexer of the second shared node to a first port of a second optical cross connect using a third connecting line;

optically coupling a second Add-Drop Multiplexer of the second shared node to a second port of the second optical cross connect using a fourth connecting line; and optically coupling a third port of the second optical cross connect to the shared protect line;

optically coupling the first Add-Drop Multiplexer of the first shared node to the first Add-Drop Multiplexer of the second shared node using a first working line;

optically coupling the first Add-Drop Multiplexer of the first shared node to a first unshared node using a second working line and a first protect line;

optically coupling the first Add-Drop Multiplexer of the second shared node to a second unshared node using a third working line and a second protect line; and optically coupling the first unshared node to the second unshared node using a fourth working line and a third protect line to form a first ring.

15. The method of claim 14 further comprising the steps of:

optically coupling the second Add-Drop Multiplexer of the first shared node to the second Add-Drop Multiplexer of the second shared node using a fifth working line;

optically coupling the second Add-Drop Multiplexer of the first shared node to a third unshared node using a sixth working line and a fourth protect line;

optically coupling the second Add-Drop Multiplexer of the second shared node to a fourth unshared node using a seventh working line and a fifth protect line; and optically coupling the third unshared node to the fourth unshared node using an eighth working line and a sixth protect line to form a second ring that overlaps the first ring at the first and second shared nodes.

16. A multi-ring optical communication network with a reduced number of protect lines, comprising:

first and second working rings, said first and second working rings sharing an overlapping section having first and second shared nodes, a first working line forming part of said first working ring and a second working line forming part of said second working ring;

each of said first and second working rings also having an unshared section having at least one unshared node and working lines for coupling said first shared node to said second shared node via said at least one unshared node;

said overlapping section further comprising a protect line which is shared by said first working ring and said second working ring.

17. A multi-ring optical communication network with a reduced number of protect lines, comprising:

first and second working rings, said first and second working rings sharing an overlapping section having first and second shared nodes, a first working line forming part of said first working ring and a second working line forming part of said second working;

said overlapping section further comprising a protect line which is shared by said first working ring and said second working ring;

wherein said first shared node of said overlapping section of said first and second working rings further comprises:

a first Add-Drop Multiplexer having a first pair of opposite ports optically coupled to a first working line of a non-overlapping section of said first working ring and to said first working line of said overlapping section of said first working ring and one port of a second pair of opposite ports optically coupled to a first protect line of said non-overlapping section of said first working ring;

a second Add-Drop Multiplexer having a first pair of opposite ports optically coupled to a first working line of a non-overlapping section of said second working ring and to said second working line of said overlapping section of said second working ring and one port of a second pair of opposite ports optically coupled to a first protect line of said non-overlapping section of said second working ring; and a first optical cross connect, comprising:

a first port optically coupled to a second port of said second pair of opposite ports of said first Add-Drop Multiplexer through a first connecting line;

a second port optically coupled to a second port of said second pair of opposite ports of said second Add-Drop Multiplexer through a second connecting line;

a third port optically coupled to said second shared node through said shared protect line; and an internal switch for selectively coupling one of said first and second ports of said first optical cross connect to said third port of said first optical cross connect.

18. The multi-ring optical communication network of claim 17 wherein said second shared node of said overlapping section further comprises:

a third Add-Drop Multiplexer having a first pair of opposite ports optically coupled to a second working line of said non-overlapping section of said first working ring and to said first working line of said overlapping section of said first working ring and one port of a second pair of opposite ports optically coupled to a second protect line of said non-overlapping section of said first working ring;

a fourth Add-Drop Multiplexer having a first pair of opposite ports optically coupled to a second working line of said non-overlapping section of said second working ring and to said second working line of said overlapping section of said second working ring and one port of a second pair of opposite ports optically coupled to a second protect line of said non-overlapping section of said second working ring; and a second optical cross connect, comprising:
- a first port optically coupled to a second port of said second pair of opposite ports of said third Add-Drop Multiplexer through a third connecting line;
- a second port optically coupled to a second port of said second pair of opposite ports of said fourth Add-Drop Multiplexer through a fourth connecting line;
- a third port optically coupled to said first shared node through said shared protect line; and
- an internal switch for selectively coupling one of said first and second ports of said second optical cross connect to said third port of said second optical cross connect.

19. A method of reducing protect line in a multi-ring optical communication network having first and second working rings, comprising the steps of:
- providing first and second working rings which share an overlapping section having first and second shared nodes, a first working line forming part of said first working ring and a second working line forming part of said second working ring, and providing a first protect line between said first and second shared nodes;
- providing a protect line shared by said first working ring and said second working ring, said first working ring using said shared protect line as part of a protect path for said first working ring in the event of a break in said first working ring and said second working ring using said shared protect line as part of a protect path in the event of a break in said second working ring.

20. A method of reducing protect line in a multi-ring optical communication network having first and second working rings, comprising the steps of:
- providing first and second working rings which share an overlapping section having first and second shared nodes, a first working line forming part of said first working ring and a second working line forming part of said second working ring, and providing a first protect line between said first and second shared nodes;
- providing a protect line shared by said first working ring and said second working ring, said first working ring using said shared protect line as part of a protect path for said first working ring in the event of a break in said first working ring and said second working ring using said shared protect line as part of a protect path in the event of a break in said second working ring;
- wherein the step of providing a protect line shared by said first working ring and said second working ring further comprises the steps of:
- optically coupling an input port of a first Add-Drop Multiplexer of said first shared node to a first protect line of said first working ring and coupling an output port of said first Add-Drop Multiplexer of said first shared node to a first port of an optical cross connect of said first shared node using a first connecting line;
- optically coupling an input port of a second Add-Drop Multiplexer of said first shared node to a first protect line of said second working ring and coupling an output port of said second Add-Drop Multiplexer of said first shared node to a second port of said optical cross connect of said first shared node using a second connecting line; and
- optically coupling a third port of said optical cross connect of said first shared node to said second shared node through said shared protect line.

21. The method of claim 20 wherein the step of providing a protect line shared by said first working ring and said second working ring further comprises the steps of:
- optically coupling an input port of a first Add-Drop Multiplexer of said second shared node to a second protect line of said first working ring and coupling an output port of said first Add-Drop Multiplexer of said second shared node to a first port of an optical cross connect of said second shared node using a third connecting line;
- optically coupling an input port of a second Add-Drop Multiplexer of said second shared node to a second protect line of said second working ring and coupling an output port of said second Add-Drop Multiplexer of said second shared node to a second port of said optical cross connect of said second shared node using at fourth connecting line; and
- optically coupling a third port of said optical cross connect of said second shared node to said first shared node through said shared protect line.

* * * * *

UNITED STATES PATENT AND TRADEMARK OFFICE
CERTIFICATE OF CORRECTION

PATENT NO.   : 6,154,296
DATED        : November 28, 2000
INVENTOR(S)  : Elahmadi et al It is certified that error appears in the above-identified patent and that said Letters Patent is hereby corrected as shown below:

Column 6,
Line 44, delete "fail" and insert -- pair --.
Line 61, delete "pail" and insert -- pair --.

Signed and Sealed this

Ninth Day of September, 2003

JAMES E. ROGAN
*Director of the United States Patent and Trademark Office*